United States Patent [19]

Chiba et al.

[11] Patent Number: 4,612,346
[45] Date of Patent: Sep. 16, 1986

[54] RESINOUS COMPOSITION

[75] Inventors: Kazumasa Chiba, Nagoya; Kiyoji Tanaka, Kagamihara, both of Japan

[73] Assignee: Toray Industries, Inc., Tokyo, Japan

[21] Appl. No.: 620,148

[22] Filed: Jun. 13, 1984

[30] Foreign Application Priority Data

Jun. 14, 1983 [JP] Japan ................. 58-106358
Aug. 5, 1983 [JP] Japan ................. 58-142510

[51] Int. Cl.4 ............................. C08L 77/00
[52] U.S. Cl. ......................... 525/66; 525/182
[58] Field of Search ................... 525/66, 182

[56] References Cited

U.S. PATENT DOCUMENTS 4,017,557 4/1977 Hammer et al. ............... 525/66
4,174,358 11/1979 Epstein ...................... 525/184

Primary Examiner—John C. Bleutge
Assistant Examiner—A. L. Carrillo
Attorney, Agent, or Firm—Austin R. Miller

[57] ABSTRACT

A resinous composition, having excellent toughness, flexibility, heat resistance and moldability, comprises (A) from 5 to 98% by weight of a polyamide and (B) from 95 to 2% by weight of a polyolefin modified with from 0.001 to 10% by mole based on all polymer components of a component having at least one functional group selected from the groups represented by the following general formulas (I), (II) and (III);

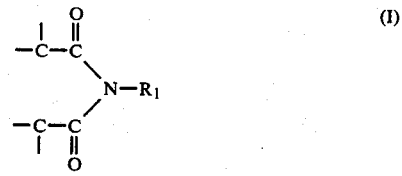

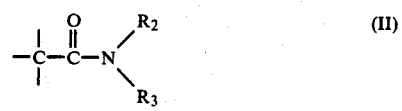

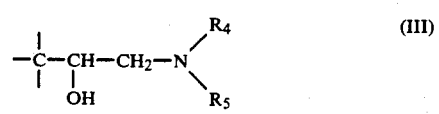

wherein $R_1$ denotes an organic group and $R_2$, $R_3$, $R_4$ and $R_5$ denote a group selected from the groups consisting of hydrogen atom and organic group respectively.

8 Claims, No Drawings

RESINOUS COMPOSITION

BACKGROUND OF THE INVENTION (1) Field of the Invention

The present invention relates to a resinous composition having excellent toughness, flexibility, heat resistance and moldability.

(2) Description of the Prior Art

Recently, a molding composition which comprises a polyamide and a various polyolefin has been investigated in order to enhance impact strength of polyamide in the absolute dried condition and in the cold condition and to improve heat resistance, especially rigidity and creep resistance of polyolefin at higher circumambient temperatures. However, it is generally difficult to obtain an intimate composition comprising a polyamide and a polyolefin by melt-blending of both components using such as extruder, on account of that both polarity and reactivity is so different between a polyamide and a polyolefin that these both components have poor compatibility each other. In order to conquer this disadvantage and obtain an intimate composition comprising a polyamide and a polyolefin, various methods and compositions have been proposed. For example, U.S. Pat. Nos. 3,845,163 and 4,174,358 disclose compositions comprising polyamide and polyolefin modified with $\alpha,\beta$-unsaturated carboxylic acid derivatives which can react chemically with polyamide. The compositions disclosed in the above-mentioned prior arts show fine morphology and an enhancement of impact strength of polyamide can be achieved because of a high reactivity of the modified polyolefin.

But on the other hand, there appears distinct disadvantage owing to reaction between the polyamide and the modified polyolefin, that is, as a result of said reaction, fluidity of the composition at injection molding is deteriorated and the surface appearance of the molded articles becomes poor on account of local increase of viscosity.

It has now been found that the resinous composition having both excellent physical properties in respect to toughness, flexibility and heat resistance and good moldability can be provided according to a composition comprising a polyamide and a polyolefin modified with functional groups which cannot substantially react with the terminal amino groups or amide groups in the main chain of the polyamide but can enhance compatibility to the polyamide.

BRIEF SUMMARY OF THE INVENTION

An object of the present invention is to provide a resinous composition comprising a polyamide and a novel modified polyolefin which cannot substantially react with a polyamide, but has an excellent compatibility therewith.

Another object of the present invention is to provide a resinous composition comprising a polyamide and a modified polyolefin which has excellent impact strength, flexibility, heat resistance, moldability and the like.

A further object of the present invention is to provide a resinous composition whose both components, that is, a polyamide and a modified polyolefin form an intimate mixture and fine morphology over a wide range of composite ratios.

Other and further objects, features and advantages of the present invention will appear more fully from the following description.

These objects can be attained by providing a resinous composition comprising (A) from 5 to 98% by weight of a polyamide and (B) from 95 to 2% by weight of a polyolefin modified with from 0.001 to 10% by mole based on all polymer components of a component having at least one functional group selected from the groups represented by the following general formulas (I), (II) and (III)

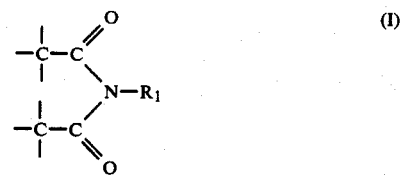

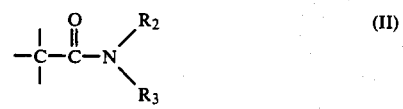

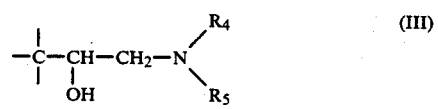

wherein $R_1$ denotes an organic group and $R_2$, $R_3$, $R_4$ and $R_5$ denote a group selected from the group consisting of a hydrogen atom and an organic group respectively and at least one of $R_2$ and $R_3$ denotes an organic group and at least one of $R_4$ and $R_5$ denotes an organic group.

DESCRIPTION OF THE PREFERRED EMBODIMENTS

The polyamide employed in the present invention is a high polymer having the acid amide bond of —NH-CO—. Representative examples of components of the polyamide include aminocarboxylic acids such as 6-aminocaproic acid, 11-aminoundecanoic acid, 12-aminododecanoic acid and p-aminomethylbenzoic acid, lactams such as e-caprolactam and ω-laurolactam, diamines such as tetramethylenediamine, hexamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, m-xylylenediamine, p-xylylenediamine, 1,3-bis(aminomethyl) cyclohexane, 1-amino-3-aminomethyl-3,5,5-trimethylcyclohexane, 3(4),8(9)-bis(aminomethyl)tricyclo[5,2,1,0$^{2,6}$ ] decane, bis(4-aminocyclohexyl)methane, 2,2-bis(4-aminocyclohexyl)propane, bis(aminopropyl)piperazine, aminoethylpiperazine, $\alpha,\omega$-diaminopolyoxyethylene and $\alpha,\omega$-diaminopolyoxypropylene and dicarboxylic acids such as adipic acid, suberic acid, azelaic acid, sebacic acid, dodecadioic acid, terephthalic acid, isophthalic acid, 2-chloroterephthalic acid, 2-methylterephthalic acid, 5-methylisophthalic acid, 5-sodiumsulfoisophthalic acid, hexahydroterephthalic acid, hexahydroisophthalic acid, and diglycolic acid. Suitable polyamides employed in the present invention include homopolyamides such as polycaproamide (nylon 6), polyhexamethyleneadipamide (nylon 66), polyhexamethylenesebacamide (nylon 610), polyhexamethylenedodecamide (nylon 612), polyundecamethyleneadipamide (nylon 116), polyundecaneamide (nylon 11), polydodecaneamide (nylon 12), polytrimethylhexamethyleneteraphthalamide (nylon TMD T), polyhexamethyleneisophthalamide (nylon 6I), polybis(4-aminocyclohexyl)methanedodecamide (nylon PACM 12), poly-m-xylyleneadipamide (nylon MXD 6), polyundecamethyleneterephthalamide (nylon 11T), polyundecamethylenehexahydroterephthalamide (nylon 11T(H)), and their copolyamides and the mixture thereof. The polyamide of the present invention can be produced according to ordinary process of melt-polymerization. The degree of polymerization of the polyamide is not defined and generally a relative viscosity of the polyamide to be employed, which is measured at 25° C. in 98% sulfuric acid at a concentration of 1.0%, may be varied from about 2.0 to about 5.0.

The modified polyolefin employed in the present invention is a polyolefin having at least one functional group selected from the groups represented by the following general formulas (I), (II) and (III).

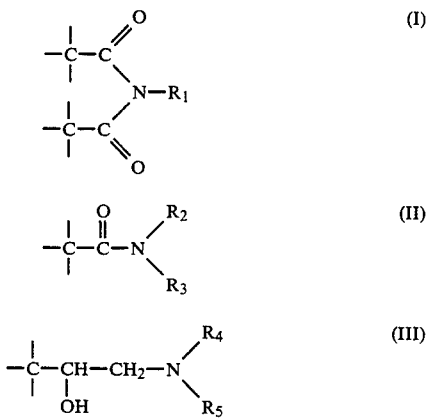

wherein $R_1$ denotes an organic group and $R_2$, $R_3$, $R_4$ and $R_5$ denote a group selected from the groups consisting of hydrogen atom and organic group respectively and at least one of $R_2$ and $R_3$ denotes an organic group and at least one of $R_4$ and $R_5$ denotes an organic group. Preferably, the organic group represented by $R_1$, $R_2$, $R_3$, $R_4$ and $R_5$ is selected from the groups consisting of aliphatic group having 1 to 30 carbon atoms, alicyclic group having 1 to 30 carbon atoms, aromatic group having 1 to 30 carbon atom and heterocyclic group having 1 to 30 carbon atoms. Representative examples of the organic group represented by $R_1$, $R_2$, $R_3$, $R_4$ and $R_5$ include methyl, ethyl, butyl, hexyl, dodecyl, oleyl, stearyl, cyclohexyl, benzyl, phenyl, naphthyl, (3,5-diamino)-2,4,6-triazino, 2-hydroxymethyl, 3-hydroxypropyl, morphoryno and group shown by the following general formula (IV).

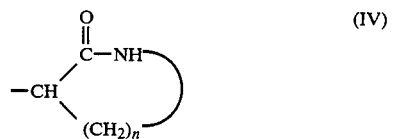

wherein n denotes an integer of 2 to 10, preferably n is selected from an integer of 2, 3, 4 and 10, most preferably n is an integer of 4. That is, a modified polyolefin having the functional group represented by the following formula (V) is employed most preferably in the present invention.

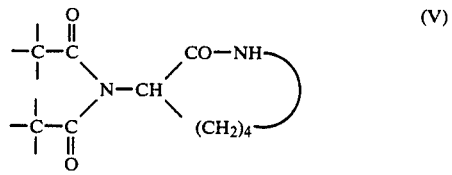

In the present invention, the functional groups represented by the above-described general formulas (I), (II) and (III) can be formed by reaction of primary or secondary aliphatic amines, alicyclic amines or aromatic amines with carboxylic acid group, acid anhydride group or epoxy group and the thus obtained functional groups can be introduced into side chain or main chain of polyolefin to provide the modified polyolefin.

The polyolefin modified with the specified functional groups represented by the above-mentioned formulas can be produced by copolymerization or graft copolymerization of olefin monomer and N-substituted imide monomer, N-substituted amide monomer or N-substituted hydroxyethyl monomer which are obtained by reaction of the various amines with α,β-ethylenically unsaturated carboxylic acid, their anhydride or unsaturated vinyl monomer having epoxy group. The modified polyolefin of the present invention can be also produced by reaction of the various amines with polyolefin modified with carboxylic acid, acid anhydride or epoxy group. Representative examples of α,β-unsaturated carboxylic acid, their acid anhydride and unsaturated vinyl monomer having epoxy group include acrylic acid, methacrylic acid, maleic acid, fumaric acid, itaconic acid, crotonic acid, methyl maleic acid, methyl fumaric acid, mesaconic acid, citraconic acid, glutaconic acid, methyl hydrogen maleate, ethyl hydrogen maleate, methyl hydrogen fumarate, methyl hydrogen itaconate, maleic anhydride, itaconic anhydride, citraconic anhydride, endo-bicyclo-[2,2,1]-5-heptene-2,3-dicarboxylic anhydride, glycidylacrylate, glycidylmethacrylate, vinyl glycidyl ether, allyl glycidyl ether and so on.

Representative examples of the various amines which react with the carboxylic acid group, acid anhydride group or epoxy group and form the functional groups represented by the above-described general formulas (I), (II) and (III), include methylamine, ethylamine, butylamine, hexylamine, dodecylamine, oleylamine, stearylamine, cyclohexylamine, benzylamine, aniline, naphthylamine, dimethylamine, diethylamine, methylethylamine, dibutylamine, distearylamine, dicyclohexylamine, ethylcyclohexylamine, methylaniline, phenylnaphthylamine, melamine, ethanolamine, 3-amino-1-propanol, diethanolamine, morpholine and lactam derivatives such as α-amino-ω-lactam and $N^\alpha$-mono-substitued amino-ω-lactam. Among Nα-mono-substituted amino-ε-lactam, α-monomethylamino-ε-caprolactam, α-monoethylamino-ε-caprolactam, α-monopropylamino-ε-caprolactam, α-monobutylamino-ε-caprolactam, α-monophenylamino-ε-caprolactam and α-monobenzylamino-ε-caprolactam are more preferable. Suitable olefin monomers employed as the main component of the modified polyolefin of the present invention include ethylene, propylene, 1-butene, 1-pentene, 4-methylpentene-1, 1-hexene, 1,4-hexadiene, dicyclopentadiene, 2,5-norbornadiene, 5-ethyl-2,5-norbornadiene, 5-ethylidene norbornene, 5-(1'-propenyl)-2-norbornene, isobutylene, butadiene, isoprene, vinyl acetate, styrene, vinylchloride, ethylacrylate, isobutylacrylate, methyl methacrylate, zinc methacrylate and acrylamide.

Suitable modified polyolefins empoyled in the composition of the present invention include polyethylene, ethylene/propylene copolymer, ethylene/butene-1 copolymer, ethylene/propylene/1,4-hexadiene copolymer, ethylene/propylene/5-ethylidenenorbornene copolymer, ethylene/propylene/5-ethyl-2,5-norbornadiene copolymer, ethylene/propylene/dicyclopentadiene copolymer and the like, which have the functional group represented by the above-described general formulas (I), (II) and (III) in the side chain or main chain of the polyolefin.

The components having the functional group represented by the above-described general formulas (I), (II) and (III) can be employed in the amount of 0.001 to 10% by mole, preferably 0.01 to 5% by mole based on all polymer components of the modified polyolefin of the present invention. When this amount is less than 0.001% by mole, satisfactory effect of improving the compatibility between polyolefin and polyamide cannot be expected and the resulting resinous composition cannot have fine morphology. On the other hand, when this amount is more than 10% by mole, side reactions such as degradation and gelation of the modified polyolefin occur disadvantageously. The degree of polymerization of the modified polyolefin is not defined and, generally, melt index thereof according to ASTM D-1238 may be varied from about 0.05 to 50 g/10 min. It is possible to mix a small amount of ordinary polyolefin having no functional group with the modified polyolefin of the present invention.

Although the modified polyolefin of the present invention does not have the such a functional group as capable of reacting with terminal amino groups or amide groups in the main chain of the polyamide, it has a sufficient compatibility to the polyamide. That is, the modified polyolefin having the functional groups represented by the above-described formulas (I), (II) and (III), can possess an excellent ability to achieve an intimate morphology with the polyamide since the some of modified polyolefins have an amide group in common with the polyamide and the others have an imide group which resembles an amide group contained in the polyamide, which enables it to impart the modified polyolefin a specific compatibility to the polyamide without substantial chemical reaction. As a result of superior compatibility between the modified polyolefin and the polyamide, the resinous composition having excellent toughness, flexibility, heat resistance and moldability can be obtained according to the present invention. But the modified polyolefin of the present invention may optionally have such functional groups as capable of reacting with the polyamide in small amounts without greatly changing the essential characteristics of the composition of the present invention.

A resinous composition of the present invention comprises from 5 to 98%, preferably 10 to 95%, most preferably 50 to 95% by weight of a polyamide and from 95 to 2%, preferably 90 to 5%, most preferably 50 to 5% by weight of a modified polyolefin. A ratio of a polyamide to a modified polyolefin is depending upon the purpose and usage of the composition. Generally, in case that the major component is a polyamide, the composition which has excellent toughness, flexibility and fatigue resistance keeping the characteristics of a polyamide can be obtained. On the other hand, in case that the major component is a modified polyolefin, heat resistance of polyolefin can be improved effectively by polyamide incorporated in the composition. Particularly, one of the characteristic features of the composition according to the present invention exists in that it has fluidity superior to that of various preceding compositions and it can provide the molded articles having excellent surface appearance.

The resinous composition of the present invention can be prepared by using conventional mixing methods. An industrially advantageous process includes dry-blending pellet, powder or chip of the polyamide and the modified polyolefin in a mixing machine such as a Henschel mixer. The resulting mixture, if desired, is heated and kneaded into a molten state by conventional single or twin screw extruder and is then molded into various shaped articles. In the present invention, it is possible to form the modified polyolefin having the functional groups represented by the above-described formulas (I), (II) and (III) at the time of melt-kneading of the polyamide and the polyolefin having the functional groups consisting of carboxylic acid group, acid anhydride group and epoxy group by addition of various amines.

Other additives may be contained in the resinous composition of the present invention without preventing its moldability and mechanical properties. Representative examples of additives include pigments, dyes, reinforcing agents, fillers, heat stabilizers, antioxidants, light stabilizers, flame retarding agents, lubricants, mold-releasing agents, antistatic agents, plasticizers, nucleating agents, antiblocking agents, and other polymer materials. Particularly, the resinous composition of the present invention additionally containing inorganic or organic fibrous reinforcing agents such as glass fibers, carbon fibers and asbestos fibers and powdery or beaded fillers such as talc, wollastonite, calcium carbonate, mica, glass beads and potassium titanate wiskers, is important for practical use on account of high rigidity and excellent impact strength.

The resinous composition of the present invention is useful for various injection-molded articles, hoses, tubings, films, monofilaments, wire coating, blow-molded articles, laminates and so on. Such articles are useful for a variety of parts, especially for machinery parts, automobile parts and electrical parts.

The present invention will be more clearly understood with reference to the following examples. Properties of the composition described in examples were measured by the following methods.

(1) Relative viscosity: JIS K6810
(2) Melt index: ASTM D1238
(3) Fluidity was determined as minimum injection pressure, i.e. lower limit pressure filled up to a mold at injection molding. The smaller value, the better fluidity.
(4) Tensile properties: ASTM D638
(5) Flexural properties: ASTM D790
(6) Izod impact strength: ASTM D256
(7) Heat distortion temperature: ASTM D648
(8) Surface appearance of molded articles: observation with the naked eye.

EXAMPLE A (Preparation of a modified polyolefin A)

100 parts by weight of ethylene/propylene copolymer consisting of 80 mole % of ethylene and 20 mole % of propylene, 0.1 parts by weight of di-t-buthylperoxide and 1.0 part by weight of maleic anhydride were mixed by Henschel mixer and the resulting mixture was melt-kneaded using a extruder having a diameter of 40 mm at 200° C. to yield pellets whereby a polyolefin modified with maleic anhydride by graft reaction was obtained. The obtained pellets proved to have 0.52 wt % of maleic anhydride by IR analysis

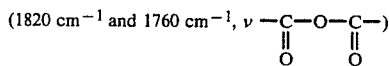

after extraction of unreacted maleic anhydride therefrom by acetone.

100 parts by weight of the thus-obtained ethylene/-propylene-g-maleic anhydride copolymer ("g" represents grafting) and 2 parts by weight of α-amino-ε-caprolactam were mixed and the mixture was kneaded using a Bumbury mixer at 190° C. for 5 minutes to yield modified polyolefin chips. After extraction of unreacted α-amino-ε-caprolactam from the chips by ethanol, IR analysis of the resulting chips was carried out and it was found that signals at 1820 cm$^{-1}$ and 1760 cm$^{-1}$ assigned to acid anhydride group disappeared completely and peak of imide group having five-membered ring came out at 1710 cm$^{-1}$. As a result of IR spectrum, the obtained modified polyolefin proved to be ethylene/propylene copolymer having 0.16 mole % of the functional group represented by the following formula in the side chain. Melt index of the modified polyolefin was 0.5 g/10 min.

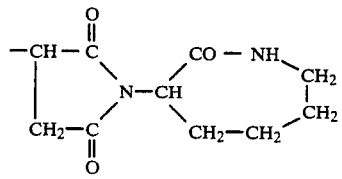

EXAMPLE 1-4

Nylon 6 having relative viscosity of 2.70 was prepared by melt-polymerization of ε-caprolactam at 260° C. This nylon 6 and the modified polyolefin prepared by the method of Example A were mixed at a ratio described in Table 1 and the resulting mixture was melt-kneaded at 270° C. using a 65 mmφ extruder. The discharged melt-guts were quenched by water, cut and dried in vacuo prior to molding. The obtained pellets were injection-molded at cylinder temperature of 250° C. and mold temperature of 80° C. to give test-pieces and to evaluate fluidity. Mechanical properties of these test-pieces were measured according to ASTM procedures and the obtained results were summarized in Table 1.

COMPARATIVE EXAMPLE 1

The test-piece from nylon 6 employed in Example 1-4 had 5.5 kg cm/cm notch of izod impact strength, whose toughness was practically insufficient.

COMPARATIVE EXAMPLE 2

Heat distortion temperature of modified polyolefin employed in Example 1-4 was 54° C., whose heat resistance was insufficient.

COMPARATIVE EXAMPLE 3

60% by weight of nylon 6 employed in Example 2 and 40% by weight of ethylene/propylene-g-maleic anhydride copolymer prepared in the first step of Example A were mixed and the mixture was melt-kneaded and injection-molded in a similar manner to Example 2. The minimum injection pressure of this composition was 510 kg/cm² and its fluidity proved to be inferior to that of the composition of Example 2.

EXAMPLE B (Preparation of a modified polyolefin B)

A reaction of maleic anhydride and α-amino-ε-caprolactam was carried out in N,N-dimethylformamide at 30° C. to yield maleamic acid and then ring closure of maleamic acid was made in the presence of acetic anhydride and pyridine at 60° C. to yield a functional monomer represented by the following formula.

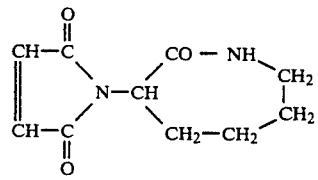

100 parts by weight of ethylene/propylene copolymer consisting of 80 mole % of ethylene and 20 mole % of propylene, 0.1 parts by weight of α,α'-bis-t-butylperoxy-p-diisopropylbenzene and 1.0 part by weight of the above-described maleimide derivatives were mixed and then the mixture was kneaded at 220° C. using a 40 mmφ extruder to yield a modified polyolefin pellets. After extraction of the unreacted functional monomer from the crushed pellets by acetone, IR analysis was carried out and it was found that IR spectrum of thus obtained modified polyolefin was quite same as that of Example A. Therefore, the modified polyolefin proved to be ethylene/propylene copolymer having the functional group represented by the following formula in the side chain.

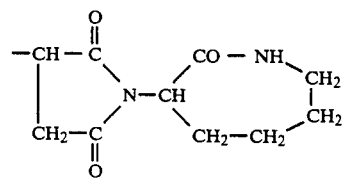

EXAMPLE 5-7

Nylon 66 having relative viscosity of 2.90 was prepared by melt-polymerization of equimolar salt from hexamethylene diamine and adipic acid at 280° C. This nylon 66 and the modified polyolefin prepared according to the method of Example B were mixed at a ratio described in Table 2 and the mixture was melt-kneaded at 290° C. using a 65 mmφ extruder. The discharged melt-guts were quenched by water, cut and dried in vacuo prior to molding. The obtained pellets were injection-molded at cylinder temperature of 275° C. and mold temperature of 80° C. to give test-pieces and to evaluate fluidity. Mechanical properties of these test-pieces were measured and the obtained results were summarized in Table 2.

EXAMPLE 8

100 parts by weight of the mixture consisting of 75% by weight of nylon 6 employed in Example 1 and 25% by weight of ethylene/propylene-g-maleic anhydride copolymer prepared in the first step of Example A and 2 parts by weight of α-amino-ε-caprolactam were mixed and the mixture was melt-kneaded at 270° C. using a extruder to yield pellets. The obtained pellets were immersed in m-cresol and nylon was dissolved off completely. IR spectrum of undissolved component, that is, the modified polyolefin was quite same as that of Example A. Therefore, it was found that a ethylene/propylene copomyler having the functional group represented by the following formula in the side chain was produced in the above-descibed procedure.

$$\begin{array}{c} O \\ \| \\ -CH-C \\ | \\ CH_2-C \\ \| \\ O \end{array} \begin{array}{c} CO-NH \\ / \\ N-CH \\ \\ CH_2-CH_2 \end{array} \begin{array}{c} CH_2 \\ | \\ CH_2 \end{array}$$

The pellets consisting of nylon 6 and modified polyolefin were molded in a similar manner to Example 1 to give test-pieces. Mechanical properties of these test-pieces and fluidity were measured and the following results were obtained.

Minimum injection pressure: 400 kg/cm$^2$
Tensile strength at yield: 510 kg/cm$^2$
Elongation at break: >200%
Flexural strength: 710 kg/cm$^2$
Flexural modulus: 17,600 kg/cm$^2$
Izod impact strength
  23° C.: Non break
  0° C.: 72 kg.cm/cm notch
  −20° C.: 40 kg.cm/cm notch
Heat distortion temperature: 158° C.
Surface appearance of molded articles: Excellent

EXAMPLE C (Preparation of a modified polyolefin C)

100 parts by weight of a copolymer consisting of 70 mole % of ethylene, 15 mole % of propylene, 14 mole % of 1,4-hexadiene and 1 mole % of acrylic acid and 4 parts by weight of α-monomethylamino-ε-caprolactam were mixed and the mixture was kneaded at 180° C. for 10 minutes using a roll-mill to yield a modified polyolefin pellets. After extraction of unreacted α-methylamino-ε-caprolactam from the crushed pellets by ethanol, IR analysis was carried out and it was found that signal at 1710 cm$^{-1}$ assigned to carboxylic acid group disappeared completely and peak of amide group came out at 1670 cm$^{-1}$. As a result of IR spectrum, the obtained modified polyolefin proved to be ethylene/propylene/1,4-hexadiene/the functional unit represented by the following formula copolymer (melt index: 1.0 g/10 min).

$$\begin{array}{c} | \\ CH_2 \\ | \\ CH-CO-N-CH \\ | \end{array} \begin{array}{c} CH_3 \\ | \\ \end{array} \begin{array}{c} CO-NH \\ / \\ \\ CH_2-CH_2 \end{array} \begin{array}{c} CH_2 \\ | \\ CH_2 \end{array}$$

EXAMPLE 9-10

Nylon 6/66 copolymers were prepared by melt-polymerization of a mixture consisting of ε-caprolactam and hexamethylenediamine/adipic acid salt at a ratio described in Table 3. These nylon 6/66 and the modified polyolefin prepared by the method of Example C were mixed at a ratio described in Table 3 and the resulting mixture was melt-kneaded at 280° C. using a extruder and pelletized. The resulting pellets were injection-molded at cylinder temperature of 260° C. and mold temperature of 60° C. to give test-pieces and to evaluate fluidity. Mechanical properties of these test-pieces were measured and the obtained results were summarized in Table 3.

COMPARATIVE EXAMPLE 4

A copolymer consisting of 70 mole % of ethylene, 15 mole % of propylene, 14 mole % of 1,4-hexadiene and 1 mole % of vinylpyrrolidone and having melt index of 1.0 g/10 min. was prepared.

80% by weight of nylon 6/66:85/15 employed in Example 9 and 20% by weight of the ethylene/propylene/1,4-hexadiene/vinylpyrrolidone copolymer were mixed, kneaded and molded to yield test-pieces. Izod impact strength of test-pieces was 8 kg.cm/cm notch, whose toughness was practically insufficient.

EXAMPLE 11-31

According to the methods described in Example 1-8, but varying the kind and amount of polyamide and modified polyolefin, the composition was prepared and the test-pieces were molded. The properties of the molded test-pieces were summarized in Table 4. In each case, test-pieces showed excellent toughness, flexibility and heat resistance.

EXAMPLE D (Preparation of a modified polyolefin M)

100 parts by weight of ethylene/propylene copolymer consisting of 80 mole % of ethylene and 20 mole % of propylene, 0.1 parts by weight of di-t-butylperoxide and 1.0 part by weight of maleic anhydride were mixed and the mixture was melt-kneaded at 200° C. using 40 mmφ extruder to yield pellets whereby a polyolefin modified with maleic anhydride by graft reaction was obtained. The obtained pellets proved to have 0.52 wt % of maleic anhydride by IR analysis $$(1820 \text{ cm}^{-1} \text{ and } 1760 \text{ cm}^{-1}, \nu \begin{array}{c} -C-O-C- \\ \| \quad \| \\ O \quad O \end{array})$$

after extraction of unreacted maleic anhydride therefrom by acetone.

100 parts by weight of the ethylene/propylene-g-maleic anhydride copolymer and 2 parts by weight of cyclohexylamine were mixed and the mixture was kneaded at 190° C. for 5 minutes using a Bumbury mixer to yield modified polyolefin pellets. After extraction of unreacted cyclohexylamine from the pellets by ethanol, IR analysis was carried out and it was found that signals at 1820 cm$^{-1}$ and 1760 cm$^{-1}$ assigned to acid anhydride group disappeared completely and peak of imide group having five-membered ring came out at 1710 cm$^{-1}$. As a result of IR spectrum, the obtained modified polyolefin proved to be ethylene/propylene copolymer having 0.18 mole % of the functional group represented by the following formula in the side chain. Melt index of the modified polyolefin was 0.6 g/10 min.

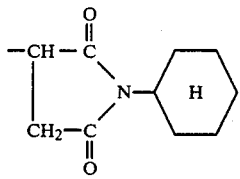

EXAMPLE 32-35

Nylon 6 having relative viscosity of 2.70 was prepared by melt-polymerization of ε-caprolactam at 260° C. This nylon 6 and the modified polyolefin prepared according to the method of Example D were mixed at a ratio described in Table 5 and the mixture was melt-kneaded at 270° C. using a 65 mmφ extruder to yield pellets. The pellets were injection-molded at cylinder temperature of 250° C. and mold temperature of 80° C. to give test-pieces and to evaluate fluidity. Mechanical properties of these test-pieces were measured and the obtained results were summarized in Table 5.

EXAMPLE E (Preparation of a modified polyolefin N)

A reaction of maleic anhydride and cyclohexylamine was carried out in N,N-dimethylformamide at 30° C. to yield maleamic acid and then ring closure of maleamic acid was made in the presence of acetic anhydride and pyridine at 30° C. to yield a functional monomer represented by the following formula.

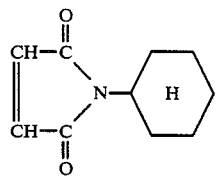

100 parts by weight of ethylene/propylene copolymer consisting of 80 mole % of ethylene and 20 mole % of propylene, 0.1 parts by weight of α,α'-bis-t-butyl-peroxy-p-diisopropylbenzene and 1.0 part by weight of the above-described maleimide derivatives were mixed and then the mixture was kneaded at 220° C. using a 40 mmφ extruder to yield a modified polyolefin pellets. After extraction of the unreacted functional monomer from the pellets by acetone, IR anaylsis was carried out and it was found that IR spectrum of this obtained modified polyolefin was quite same as that of Example D. Therefore, the modified polyolefin proved to be ethylene/propylene copolymer having the functional group represented by the following formula in the side chain.

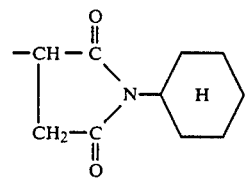

EXAMPLE 36-38

Nylon 66 having relative viscosity of 2.90 was prepared by melt-polymerization of equimolar salt consisting of hexamethylene diamine and adipic acid at 280° C. This nylon 66 and the modified polyolefin prepared according to the method of Example E were mixed at a ratio described in Table 6 and the mixture was melt-kneaded at 290° C. using a 65 mmφ extruder and pelletized. The obtained pellets were injection-molded at cylinder temperature of 275° C. and mold temperature of 80° C. to give test-pieces and to evaluate fluidity. Mechanical properties of these test-pieces were measured and the obtained results were summarized in Table 6.

EXAMPLE 39

100 parts by weight of the mixture consisting of 75% by weight of nylon 6 employed in Example 32 and 25% by weight of ethylene/propylene-g-maleic anhydride copolymer prepared in the first step of Example D and 2 parts by weight of cyclohexylamine were mixed and the mixture was melt-kneaded at 270° C. using a extruder to yield pellets. The obtained pellets were immersed in m-cresol and nylon was dissolved off completely. IR spectrum of undissolved component, that is, the modified polyolefin was quite same as that of Example D. Therefore, it was found that a ethylene/propylene copolymer having the functional group represented by the following formula in the said chain was produced in the above-described procedure.

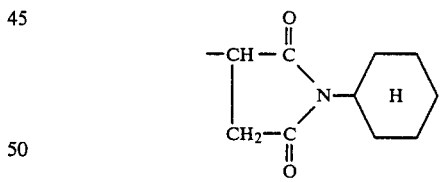

The pellets consisting of nylon 6 and modified polyolefin were molded in a similar manner to Example 32 to give test-pieces. Mechanical properties of these tesepieces and fluidity were measured and the following results were obtained.

Minimum injection pressure: 390 kg/cm$^2$
Tensile strength at yield: 520 kg/cm$^2$
Elongation at break: >200%
Flexural strength: 710 kg/cm$^2$
Flexural modulus: 17,500 kg/cm$^2$
Izod impact strength
  23° C.: Non break
  0° C.: 70 kg.cm/cm notch
  −20° C.: 35 kg.cm/cm notch
Heat distortion temperature: 158° C.
Surface appearance of molded articles: Excellent

EXAMPLE F (Preparation of a modified polyolefin O)

100 parts by weight of a copolymer consisting of 70 mole % of ethylene, 15 mole % of propylene, 14 mole % of 1,4-hexadiene and 1 mole % of acrylic acid and 3.4 parts by weight of N-methylbenzylamine were mixed and the mixture was kneaded at 180° C. for 10 minutes using a roll-mill to yield a modified polyolefin pellets. After extraction of unreacted N-methylbenzylamine from the pellets by ethanol, IR analysis was carried out and it was found that signal at 1710 cm$^{-1}$ assigned to carboxylic acid group disappeared completely and peak of amide group came out at 1670 cm$^{-1}$. As a result of IR spectrum, the obtained modified polyolefin proved to be ethylene/propylene/1,4-hexadiene/the functional unit represented by the following formula copolymer (melt index: 1.6 g/10 min).

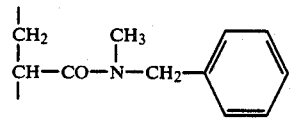

EXAMPLE 40-41

Nylon 6/66 copolymers were prepared by melt-polymerization of a mixture consisting of ε-caprolactam and hexamethylenediamine/adipic acid salt at a ratio described in Table 7. These nylon 6/66 and the modified polyolefin prepared according to the method of Example F were mixed at a ratio described in Table 7 and the mixture was melt-kneaded at 280° C. using a extruder to yield pellets. The obtained pellets were injection-molded at cylinder temperature of 260° C. and mold temperature of 60° C. to give test-pieces and to evaluate fluidity. Mechanical properties of these test-pieces were measured and the obtained results were summarized in Table 7.

EXAMPLE G (Preparation of a modified polyolefin P)

100 parts by weight of a copolymer consisting of 90 mole % of ethylene, 8 mole % of vinyl acetate and 2 mole % of glycidyl methacrylate and 4.8 parts by weight of N-methylbenzylamine were mixed and the mixture was melt-kneaded at 180° C. using a 40 mmφ extruder to yield pellets. After extraction of unreacted N-methylbenzylamine from the pellets by ethanol, IR analysis was carried out and it was found that signal at 1140 cm$^{-1}$ assigned to glycidyl methacrylate disappeared completely and peak of hydroxy group came out at 3300 cm$^{-1}$. As a result of IR spectrum, the obtained modified polyolefin proved to be ethylene/vinyl acetate/the functional unit represented by the following formula copolymer (melt index: 5.0 g/10 min).

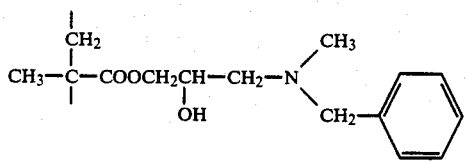

EXAMPLE 42-43

Nylon 6 and the modified polyolefin prepared by the method of Example G were mixed at a ratio described in Table 8 and the mixture was melt-kneaded using a extruder to yield pellets. The obtained pellets were injection-molded to give test-pieces and to evaluate fluidity. Mechanical properties of these test-pieces were measured and the obtained results were summarized in Table 8.

EXAMPLE 44-64

According to the method described in Example 32-39, but varying the kind and amount of polyamide and modified polyolefin, the composition was prepared and the test-pieces were molded. The properties of the molded test-pieces were summarized in Table 9. In each case, test-pieces showed excellent toughness, flexibility and heat resistance.

TABLE 1

| Example | 1 | 2 | 3 | 4 |
|---|---|---|---|---|
| Composition | | | | |
| Nylon 6 (wt %) | 80 | 60 | 40 | 20 |
| Modified polyolefin A (wt %) | 20 | 40 | 60 | 80 |
| Minimum injection pressure (kg/cm$^2$) | 320 | 370 | 400 | 350 |
| Tensile strength at yield (kg/cm$^2$) | 570 | 440 | 260 | 170 |
| Elongation at break (%) | >200 | >200 | >200 | >200 |
| Flexural strength (kg/cm$^2$) | 750 | 600 | 340 | 210 |
| Flexural modulus (kg/cm$^2$) | 19,200 | 14,000 | 8,000 | 3,100 |
| Izod impact strength | | | | |
| 23° C. (kg · cm/cm notch) | 75 | Non Break | Non Break | Non Break |
| 0° C. (kg · cm/cm notch) | 60 | Non Break | Non Break | Non Break |
| −20° C. (kg · cm/cm notch) | 22 | Non Break | Non Break | Non Break |
| Heat distortion temperature (°C.) (load 4.64 kg/cm$^2$) | 160 | 155 | 120 | 104 |
| Surface appearance of molded article | Excellent | Excellent | Excellent | Excellent |

TABLE 2

| Example | 5 | 6 | 7 |
|---|---|---|---|
| Composition | | | |
| Nylon 66 (wt %) | 75 | 60 | 30 |
| Modified polyolefin B (wt %) | 25 | 40 | 70 |
| Minimum injection pressure (kg/cm$^2$) | 330 | 380 | 370 |
| Tensile strength at yield (kg/cm$^2$) | 560 | 450 | 240 |
| Elongation at break (%) | >200 | >200 | >200 |
| Flexural strength (kg/cm$^2$) | 730 | 620 | 310 |
| Flexural modulus (kg/cm$^2$) | 18,800 | 14,600 | 7,200 |
| Izod impact strength | | | |
| 23° C. (kg · cm/cm notch) | Non Break | Non Break | Non Break |
| 0° C. (kg · cm/cm notch) | 63 | Non Break | Non Break |
| −20° C. (kg · cm/cm notch) | 24 | Non Break | Non Break |
| Heat distortion temperature (°C.) (load 4.64 kg/cm$^2$) | 163 | 158 | 110 |
| Surface appearance of molded article | Excellent | Excellent | Excellent |

TABLE 3

| Example | 9 | 10 |
|---|---|---|
| Nylon 6/66 copolymer (wt %) | 85/15 | 20/80 |

TABLE 3-continued

| Example | 9 | 10 |
|---|---|---|
| Relative viscosity | 3.40 | 2.50 |
| Composition | | |
| Nylon 6/66 (wt %) | 80 | 70 |
| Modified polyolefin C (wt %) | 20 | 30 |
| Minimum injection pressure (kg/cm$^2$) | 400 | 280 |
| Tensile strength at yield (kg/cm$^2$) | 550 | 530 |
| Flexural strength (kg/cm$^2$) | 710 | 700 |
| Flexural modulus (kg/cm$^2$) | 18,800 | 18,200 |
| Izod impact strength | | |
| 23° C. (kg · cm/cm notch) | Non Break | Non Break |
| 0° C. (kg · cm/cm notch) | Non Break | Non Break |
| −20° C. (kg · cm/cm notch) | 30 | 25 |
| Heat distortion temperature (°C.) (load 4.64 kg/cm$^2$) | 151 | 157 |
| Surface appearance of molded article | Excellent | Excellent |

TABLE 4

| Example | 11 | 12 | 13 | 14 |
|---|---|---|---|---|
| Polyamide$^a$ | | | | |
| Kind | 610 | 11 | 12 | 46 |
| Relative viscosity | 2.70 | 2.20 | 2.35 | 3.80 |
| Content (wt %) | 60 | 70 | 70 | 75 |
| Modified polyolefin$^b$ | | | | |
| Kind | [A] | [A] | [A] | [A] |
| Melt index (g/10 min) | 0.5 | 0.5 | 0.5 | 0.5 |
| Content (wt %) | 40 | 30 | 30 | 25 |
| Injection Molding | | | | |
| Cylinder temperature (°C.) | 250 | 240 | 250 | 320 |
| Minimum injection pressure (kg/cm$^2$) | 410 | 350 | 420 | 300 |
| Tensile strength at yield (kg/cm$^2$) | 410 | 420 | 420 | 580 |
| Flexural strength (kg/cm$^2$) | 550 | 520 | 510 | 780 |
| Flexural modulus (kg/cm$^2$) | 14,000 | 11,200 | 11,400 | 20,800 |
| Izod impact strength | | | | |
| 23° C. (kg · cm/cm notch) | Non Break | Non Break | Non Break | 90 |
| −20° C. (kg · cm/cm notch) | Non Break | Non Break | Non Break | 20 |
| Heat distortion temperature (°C.) (load 4.64 kg/cm$^2$) | 147 | 140 | 140 | 245 |
| Surface appearance of molded article | Excellent | Excellent | Excellent | Excellent |

| Example | 15 | 16 | 17 | 18 |
|---|---|---|---|---|
| Polyamide$^a$ | | | | |
| Kind | 116 | 6/12 | 6/66 | MXD6 |
| Relative viscosity | 2.60 | 4.30 | 2.90 | 2.40 |
| Content (wt %) | 40 | 30 | 70 | 70 |
| Modified polyolefin$^b$ | | | | |
| Kind | [C] | [C] | [C] | [D] |
| Melt index (g/10 min) | 1.0 | 1.0 | 1.0 | 0.1 |
| Content (wt %) | 60 | 70 | 30 | 30 |
| Injection Molding | | | | |
| Cylinder temperature (°C.) | 250 | 280 | 280 | 260 |
| Minimum injection pressure (kg/cm$^2$) | 360 | 380 | 290 | 300 |
| Tensile strength at yield (kg/cm$^2$) | 260 | 210 | 510 | 610 |
| Flexural strength (kg/cm$^2$) | 320 | 280 | 690 | 740 |
| Flexural modulus (kg/cm$^2$) | 7,800 | 6,700 | 18,000 | 21,000 |
| Izod impact strength | | | | |
| 23° C. (kg · cm/cm notch) | Non Break | Non Break | Non Break | 70 |
| −20° C. (kg · cm/cm notch) | Non Break | Non Break | 31 | 19 |
| Heat distortion temperature (°C.) (load 4.64 kg/cm$^2$) | 118 | 90 | 160 | 180 |
| Surface appearance of molded article | Excellent | Excellent | Excellent | Excellent |

| Example | 19 | 20 | 21 | 22 |
|---|---|---|---|---|
| Polyamide$^a$ | | | | |
| Kind | 6/6T | PACM12 | 11T | 11T(H) |
| Relative viscosity | 2.70 | 2.25 | 2.30 | 2.35 |
| Content (wt %) | 40 | 75 | 60 | 70 |
| Modified polyolefin$^b$ | | | | |
| Kind | [D] | [E] | [E] | [F] |
| Melt index (g/10 min) | 0.1 | 7.2 | 7.2 | 2.8 |
| Content (wt %) | 60 | 25 | 40 | 30 |
| Injection Molding | | | | |
| Cylinder temperature (°C.) | 260 | 310 | 320 | 320 |
| Minimum injection pressure (kg/cm$^2$) | 350 | 320 | 350 | 340 |
| Tensile strength at yield (kg/cm$^2$) | 350 | 600 | 580 | 600 |
| Flexural strength (kg/cm$^2$) | 400 | 720 | 700 | 710 |
| Flexural modulus (kg/cm$^2$) | 9,300 | 18,200 | 18,000 | 18,000 |
| Izod impact strength | | | | |
| 23° C. (kg · cm/cm notch) | Non Break | 73 | Non Break | 80 |
| −20° C. (kg · cm/cm notch) | Non Break | 18 | 20 | 18 |
| Heat distortion temperature (°C.) (load 4.64 kg/cm$^2$) | 125 | 250 | 250 | 253 |
| Surface appearance of molded article | Excellent | Excellent | Excellent | Excellent |

| Example | 23 | 24 | 25 | 26 |
|---|---|---|---|---|
| Polyamide$^a$ | | | | |
| Kind | TMDT | 6I/PACMI | 6 | 66 |
| Relative viscosity | 2.55 | 2.10 | 2.95 | 2.70 |
| Content (wt %) | 70 | 75 | 60 | 50 |
| Modified polyolefin$^b$ | | | | |
| Kind | [F] | [G] | [H] | [H] |
| Melt index (g/10 min) | 2.8 | 15 | 5.0 | 5.0 |
| Content (wt %) | 30 | 25 | 40 | 50 |
| Injection Molding | | | | |
| Cylinder temperature (°C.) | 290 | 250 | 260 | 280 |
| Minimum injection pressure (kg/cm$^2$) | 400 | 370 | 280 | 300 |
| Tensile strength at yield (kg/cm$^2$) | 610 | 570 | 580 | 590 |
| Flexural strength (kg/cm$^2$) | 700 | 700 | 700 | 700 |
| Flexural modulus (kg/cm$^2$) | 21,100 | 19,400 | 21,000 | 21,200 |
| Izod impact strength | | | | |
| 23° C. (kg · cm/cm notch) | 60 | 75 | 15 | 16 |
| −20° C. (kg · cm/cm notch) | 15 | 16 | 6 | 8 |
| Heat distortion temperature (°C.) (load 4.64 kg/cm$^2$) | 140 | 110 | 170 | 175 |
| Surface appearance of molded article | Excellent | Excellent | Excellent | Excellent |

| Example | 27 | 28 | 29 | 30 | 31 |
|---|---|---|---|---|---|
| Polyamide$^a$ | | | | | |
| Kind | 6 | 66 | 6 | 6 | 6 |
| Relative viscosity | 3.10 | 3.00 | 2.70 | 2.90 | 3.10 |
| Content (wt %) | 70 | 60 | 70 | 70 | 75 |
| Modified polyolefin$^b$ | | | | | |
| Kind | [I] | [I] | [J] | [K] | [L] |
| Melt index (g/10 min) | 5.5 | 5.5 | 2.0 | 0.8 | 1.1 |
| Content (wt %) | 30 | 40 | 30 | 30 | 25 |
| Injection Molding | | | | | |
| Cylinder temperature (°C.) | 260 | 280 | 260 | 260 | 270 |
| Minimum injection pressure (kg/cm$^2$) | 310 | 310 | 270 | 290 | 300 |
| Tensile strength at yield (kg/cm$^2$) | 600 | 600 | 610 | 600 | 640 |
| Flexural strength (kg/cm$^2$) | 720 | 700 | 720 | 710 | 750 |
| Flexural modulus (kg/cm$^2$) | 21,500 | 21,600 | 20,900 | 20,000 | 21,600 |
| Izod impact strength | | | | | |
| 23° C. | 40 | 45 | Non | Non | Non |

TABLE 4-continued

| | | | | | |
|---|---|---|---|---|---|
| (kg · cm/cm notch) −20° C. | 10 | 10 | Break 20 | Break 25 | Break 20 |
| (kg · cm/cm notch) | | | | | |
| Heat distortion temperature (°C.) (load 4.64 kg/cm$^2$) | 160 | 163 | 155 | 155 | 160 |
| Surface appearance of molded article | Excellent | Excellent | Excellent | Excellent | Excellent |

TABLE 5

| Example | 32 | 33 | 34 | 35 |
|---|---|---|---|---|
| Composition | | | | |
| Nylon 6 (wt %) | 80 | 60 | 40 | 20 |
| Modified polyolefin M (wt %) | 20 | 40 | 60 | 80 |
| Minimum injection pressure (kg/cm$^2$) | 300 | 360 | 400 | 340 |
| Tensile strength at yield (kg/cm$^2$) | 550 | 410 | 260 | 180 |
| Elongation at break (%) | >200 | >200 | >200 | >200 |
| Flexural strength (kg/cm$^2$) | 740 | 580 | 330 | 200 |
| Flexural modulus (kg/cm$^2$) | 19,000 | 14,000 | 7,800 | 3,000 |
| Izod impact strength | | | | |
| 23° C. (kg · cm/cm notch) | 70 | Non Break | Non Break | Non Break |
| 0° C. (kg · cm/cm notch) | 54 | Non Break | Non Break | Non Break |
| −20° C. (kg · cm/cm notch) | 20 | Non Break | Non Break | Non Break |
| Heat distortion temperature (°C.) (load 4.64 kg/cm$^2$) | 160 | 154 | 120 | 105 |
| Surface appearance of molded article | Excellent | Excellent | Excellent | Excellent |

TABLE 6

| Example | 36 | 37 | 38 |
|---|---|---|---|
| Composition | | | |
| Nylon 66 (wt %) | 75 | 60 | 30 |
| Modified polyolefin N (wt %) | 25 | 40 | 70 |
| Minimum injection pressure (kg/cm$^2$) | 330 | 360 | 360 |
| Tensile strength at yield (kg/cm$^2$) | 550 | 460 | 220 |
| Elongation at break (%) | >200 | >200 | >200 |
| Flexural strength (kg/cm$^2$) | 700 | 610 | 320 |
| Flexural modulus (kg/cm$^2$) | 18,500 | 14,200 | 7,200 |
| Izod impact strength | | | |
| 23° C. (kg · cm/cm notch) | Non Break | Non Break | Non Break |
| 0° C. (kg · cm/cm notch) | 61 | Non Break | Non Break |
| −20° C. (kg · cm/cm notch) | 22 | Non Break | Non Break |
| Heat distortion temperature (°C.) (load 4.64 kg/cm$^2$) | 162 | 158 | 110 |
| Surface appearance of molded article | Excellent | Excellent | Excellent |

TABLE 7

| Example | 40 | 41 |
|---|---|---|
| Nylon 6/66 copolymer (wt %) | 85/15 | 20/80 |
| Relative viscosity | 3.40 | 2.50 |
| Composition | | |
| Nylon 6/66 (wt %) | 80 | 70 |
| Modified polyolefin O (wt %) | 20 | 30 |
| Minimum injection pressure (kg/cm$^2$) | 410 | 300 |
| Tensile strength at yield (kg/cm$^2$) | 550 | 520 |
| Flexural strength (kg/cm$^2$) | 700 | 700 |
| Flexural modulus (kg/cm$^2$) | 18,400 | 18,000 |
| Izod impact strength | | |

TABLE 7-continued

| Example | 40 | 41 |
|---|---|---|
| 23° C. (kg · cm/cm notch) | Non Break | Non Break |
| 0° C. (kg · cm/cm notch) | 53 | 62 |
| −20° C. (kg · cm/cm notch) | 30 | 28 |
| Heat distortion temperature (°C.) (load 4.64 kg/cm$^2$) | 151 | 155 |
| Surface appearance of molded article | Excellent | Excellent |

TABLE 8

| Example | 42 | 43 |
|---|---|---|
| Relative viscosity of nylon 6 | 2.75 | 3.35 |
| Composition | | |
| Nylon 6 (wt %) | 80 | 60 |
| Modified Polyolefin (wt %) | 20 | 40 |
| Injection Molding | | |
| Cylinder temperature (°C.) | 250 | 270 |
| Minimum injection pressure (kg/cm$^2$) | 360 | 410 |
| Tensile strength at yield (kg/cm$^2$) | 540 | 400 |
| Flexural strength (kg/cm$^2$) | 700 | 560 |
| Flexural modulus (kg/cm$^2$) | 19,800 | 14,600 |
| Izod impact strength | | |
| 23° C. (kg · cm/cm notch) | 75 | Non Break |
| 0° C. (kg · cm/cm notch) | 43 | Non Break |
| −20° C. (kg · cm/cm notch) | 22 | Non Break |
| Heat distortion temperature (°C.) | 160 | 152 |
| Surface appearance of molded article | Excellent | Excellent |

TABLE 9

| Example | 44 | 45 | 46 | 47 |
|---|---|---|---|---|
| Polyamide[a] | | | | |
| Kind | 610 | 11 | 12 | 46 |
| Relative viscosity | 2.70 | 2.20 | 2.35 | 3.80 |
| Content (wt %) | 60 | 70 | 70 | 75 |
| Modified polyolefin[b] | | | | |
| Kind | [M] | [M] | [M] | [M] |
| Melt index (g/10 min) | 0.6 | 0.6 | 0.6 | 0.6 |
| Content (wt %) | 40 | 30 | 30 | 25 |
| Injection Molding | | | | |
| Cylinder temperature (°C.) | 250 | 240 | 250 | 320 |
| Minimum injection pressure (kg/cm$^2$) | 380 | 340 | 400 | 300 |
| Tensile strength at yield (kg/cm$^2$) | 430 | 430 | 420 | 590 |
| Flexural strength (kg/cm$^2$) | 560 | 550 | 540 | 780 |
| Flexural modulus (kg/cm$^2$) | 14,400 | 12,100 | 11,800 | 21,000 |
| Izod impact strength | | | | |
| 23° C. (kg · cm/cm notch) | Non Break | Non Break | Non Break | 90 |
| −20° C. (kg · cm/cm notch) | Non Break | 63 | Non Break | 20 |
| Heat distortion temperature (°C.) (load 4.64 kg/cm$^2$) | 146 | 141 | 140 | 245 |
| Surface appearance of molded article | Excellent | Excellent | Excellent | Excellent |

| Example | 48 | 49 | 50 | 51 |
|---|---|---|---|---|
| Polyamide[a] | | | | |
| Kind | 116 | 6/12 | 6/66 | MXD6 |
| Relative viscosity | 2.60 | 4.30 | 2.90 | 2.40 |
| Content (wt %) | 40 | 30 | 70 | 70 |
| Modified polyolefin[b] | | | | |
| Kind | [O] | [O] | [O] | [Q] |
| Melt index (g/10 min) | 1.6 | 1.6 | 1.6 | 0.2 |
| Content (wt %) | 60 | 70 | 30 | 30 |
| Injection Molding | | | | |
| Cylinder temperature (°C.) | 250 | 280 | 280 | 260 |
| Minimum injection pressure | 330 | 360 | 290 | 300 |

TABLE 9-continued

| | | | | |
|---|---|---|---|---|
| pressure (kg/cm²) | | | | |
| Tensile strength at yield (kg/cm²) | 260 | 220 | 520 | 600 |
| Flexural strength (kg/cm²) | 300 | 280 | 700 | 740 |
| Flexural modulus (kg/cm²) | 7,500 | 6,700 | 18,200 | 21,200 |
| Izod impact strength | | | | |
| 23° C. (kg · cm/cm notch) | Non Break | Non Break | Non Break | 72 |
| −20° C. (kg · cm/cm notch) | Non Break | Non Break | 30 | 19 |
| Heat distortion temperature (°C.) (load 4.64 kg/cm²) | 115 | 91 | 162 | 182 |
| Surface appearance of molded article | Excellent | Excellent | Excellent | Excellent |
| Example | 52 | 53 | 54 | 55 |
| Polyamide[a] | | | | |
| Kind | 6/6T | PACM12 | 11T | 11T(H) |
| Relative viscosity | 2.70 | 2.25 | 2.30 | 2.35 |
| Content (wt %) | 40 | 75 | 60 | 70 |
| Modified polyolefin[b] | | | | |
| Kind | [Q] | [R] | [R] | [S] |
| Melt index (g/10 min) | 0.2 | 7.0 | 7.0 | 2.5 |
| Content (wt %) | 60 | 25 | 40 | 30 |
| Injection Molding | | | | |
| Cylinder temperature (°C.) | 260 | 310 | 320 | 320 |
| Minimum injection pressure (kg/cm²) | 360 | 400 | 420 | 400 |
| Tensile strength at yield (kg/cm²) | 350 | 610 | 600 | 610 |
| Flexural strength (kg/cm²) | 410 | 740 | 710 | 730 |
| Flexural modulus (kg/cm²) | 9,500 | 18,900 | 18,300 | 18,500 |
| Izod impact strength | | | | |
| 23° C. (kg · cm/cm notch) | Non Break | 70 | Non Break | 82 |
| −20° C. (kg · cm/cm notch) | Non Break | 18 | 18 | 18 |
| Heat distortion temperature (°C.) (load 4.64 kg/cm²) | 125 | 250 | 251 | 253 |
| Surface appearance of molded article | Excellent | Excellent | Excellent | Excellent |
| Example | 56 | 57 | 58 | 59 |
| Polyamide[a] | | | | |
| Kind | TMDT | 6I/PACMI | 6 | 66 |
| Relative viscosity | 2.55 | 2.10 | 2.95 | 2.70 |
| Content (wt %) | 70 | 75 | 60 | 50 |
| Modified polyolefin[b] | | | | |
| Kind | [S] | [T] | [U] | [U] |
| Melt index (g/10 min) | 2.5 | 15 | 4.7 | 4.7 |
| Content (wt %) | 30 | 25 | 40 | 50 |
| Injection Molding | | | | |
| Cylinder temperature (°C.) | 290 | 250 | 260 | 280 |
| Minimum injection pressure (kg/cm²) | 450 | 300 | 300 | 310 |
| Tensile strength at yield (kg/cm²) | 610 | 580 | 590 | 580 |
| Flexural strength (kg/cm²) | 700 | 700 | 710 | 710 |
| Flexural modulus (kg/cm²) | 21,000 | 19,500 | 21,200 | 21,300 |
| Izod impact strength | | | | |
| 23° C. (kg · cm/cm notch) | 64 | 72 | 16 | 15 |
| −20° C. (kg · cm/cm notch) | 15 | 15 | 6 | 5 |
| Heat distortion temperature (°C.) (load 4.64 kg/cm²) | 141 | 111 | 170 | 175 |
| Surface appearance of molded article | Excellent | Excellent | Excellent | Excellent |
| Example | 60 | 61 | 62 | 63 | 64 |
| Polyamide[a] | | | | | |
| Kind | 6 | 66 | 6 | 6 | 66 |
| Relative viscosity | 3.10 | 3.00 | 2.70 | 2.90 | 2.85 |
| Content (wt %) | 70 | 60 | 70 | 70 | 70 |
| Modified polyolefin[b] | | | | | |
| Kind | [V] | [V] | [W] | [X] | [Y] |
| Melt index (g/10 min) | 5.7 | 5.7 | 2.0 | 0.9 | 0.8 |
| Content (wt %) | 30 | 40 | 30 | 30 | 30 |
| Injection Molding | | | | | |
| Cylinder temperature (°C.) | 260 | 280 | 260 | 260 | 290 |
| Minimum injection pressure (kg/cm²) | 300 | 290 | 290 | 300 | 310 |
| Tensile strength at yield (kg/cm²) | 610 | 620 | 610 | 610 | 610 |
| Flexural strength (kg/cm²) | 750 | 770 | 730 | 720 | 750 |
| Flexural modulus (kg/cm²) | 21,700 | 21,700 | 21,000 | 20,800 | 21,800 |
| Izod impact strength | | | | | |
| 23° C. (kg · cm/cm notch) | 42 | 44 | Non Break | Non Break | Non Break |
| −20° C. (kg · cm/cm notch) | 11 | 12 | 21 | 22 | 19 |
| Heat distortion temperature (°C.) (load 4.64 kg/cm²) | 160 | 163 | 154 | 155 | 165 |
| Surface appearance of molded article | Excellent | Excellent | Excellent | Excellent | Excellent |

(a) Polyamide
610: polyhexamethylene sebacamide, 11: polyundecaneamide, 12: polydodecaneamide, 46: polytetramethyleneadipamide, 116: polyundecamethyleneadipamide, 6/12: poly (caproamide/dodecaneamide) copolymer (80/20 wt %), 6/66: polycaproamide/polyhexamethyleneadipamide mixture (50/50 wt %), MXD6: poly-m-xylyleneadipamide, 6/6T: poly (caproamide/hexamethyleneterephthalamide) copolymer (40/60 wt %), PACM12: poly-bis (4-aminocyclohexyl)methanedodecamide, 11T: polyundecamethylenehexahydroterephthalamide, TMDT: polytrimethylhexamethyleneterephthalamide, 6I/PACM I: poly (hexamethyleneisophthalamide/bis (4-aminocyclohexyl) methaneisophthalamide) copolymer (70/30 wt %)

(b) Modified polyolefin
[A]: modified polyolefin A of Example A.
[C]: modified polyolefin C of Example C.
[D]: modified ethylene/butene-1:85/15 (mole %) copolymer having 0.4 mole % of functional group represented by the following formula in the side chain. (prepared in a similar manner to the method of Example A)

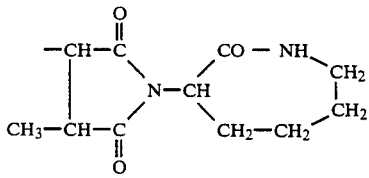

[E]: modified ethylene/propylene/dicyclopentadiene: 70/20/10 (mole %) copolymer having 0.2 mole % of functional group represented by the following formula in the side chain. (prepared in a similar manner to the method of Example A)

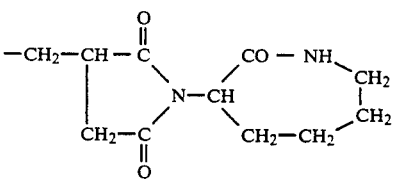

[F]: modified polyethylene having 1.5 mole % of functional group represented by the following formula in the main chain. (prepared in a similar manner to the method of Example C)

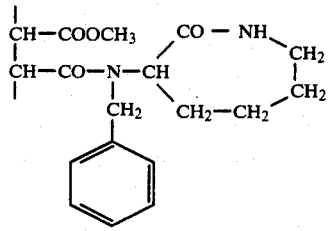

[G]: modified ethylene/propylene/norbornadiene: 65/20/15 (mole %) copolymer having 0.5 mole % of functional group represented by the following formula in the side chain. (prepared in a similar manner to the method of Example B)

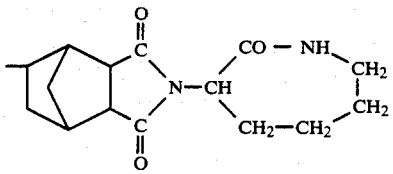

[H]: modified polypropylene having 0.3 mole % of functional group represented by the following formula in the side chain. (prepared in a similar manner to the method of Example A)

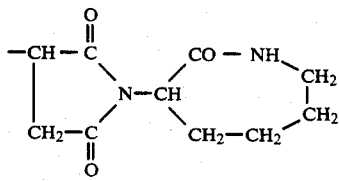

[I]: mixture consisting of 50 wt % of modified polymethylpentene having 0.1 mole % of functional group represented by the following formula in the side chain (prepared in a similar manner to the method of Example A) and 50 wt % of ethylene/methacrylic acid/zinc methacrylate: 90/3/7 (wt %) copolymer

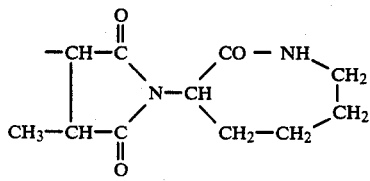

[J]: modified ethylene/propylene: 90/10 (mole %) copolymer having 1.3 mole % of functional group represented by the following formula in the main chain. (prepared in a similar manner to the method of Example C)

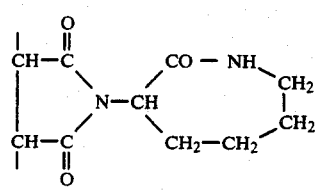

[K]: modified ethylene/propylene/5-ethylidenenorbornene: 80/13/7 (mole %) copolymer having 0.6 mole % of functional group represented by the following formula in the side chain. (prepared in a similar manner to the method of Example A)

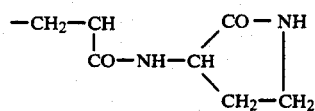

[L]: modified ethylene/propylene: 75/25 (mole %) copolymer having 0.5 mole % of functional group represented by the following formula in the side chain. (prepared in a similar manner to the method of Example A)

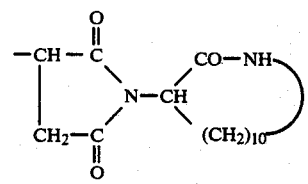

[M]: modified polyolefin of Example D
[O]: modified polyolefin of Example F
[Q]: modified ethylene/butene-1:85/15 (mole %) copolymer having 0.4 mole % of functional group represented by the following formula in the side chain. (prepared in a similar manner to the method of Example D)

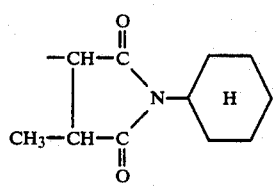

[R]: modified ethylene/propylene/dicyclopentadiene: 70/20/10 (mole %) copolymer having 0.3 mole % of functional group represented by the following formula in the side chain. (prepared in a similar manner to the method of Example D)

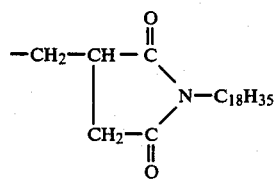

[S]: modified polyethylene having 1.7 mole % of functional group represented by the following formula in the main chain. (prepared in a similar manner to the method of Example F)

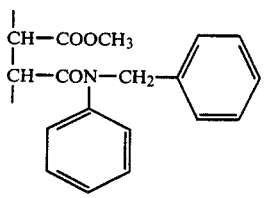

[T]: modified ethylene/propylene/norbornadiene: 65/20/15 (mole %) copolymer having 0.4 mole % of functional group represented by the following formula in the side chain. (prepared in a similar manner to the method of Example E)

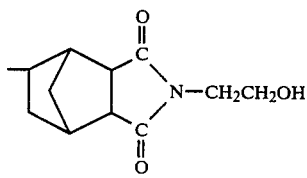

[U]: modified polypropylene having 0.4 mole % of functional group represented by the following formula in the side chain. (prepared in a similar manner to the method of Example D)

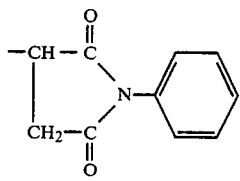

[V]: mixture consisting of 50 wt % of modified polymethylpentene having 0.1 mole % of functional group represented by the following formula in the side chain (prepared in a similar manner to the method of Example D) and 50 wt % of ethylene/methacrylic acid/zinc methacrylate: 90/3/7 (wt %) copolymer

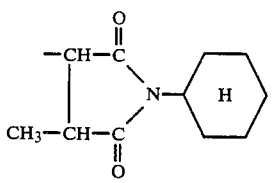

[W]: modified ethylene/propylene: 90/10 (mole %) copolymer having 1.3 mole % of functional group represented by the following formula in the main chain. (prepared in a similar manner to the method of Example F)

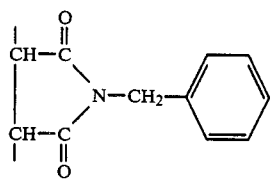

[X]: modified ethylene/propylene/5-ethylidenenorbornene: 80/13/7 (mole %) copolymer having functional group represented by the following formula in the side chain. (prepared in a similar manner to the method of Example D)

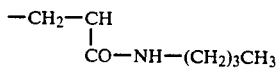

[Y]: modified ethylene/propylene: 80/20 (mole %) copolymer having functional group represented by the following formula in the side chain. (prepared in a similar manner to the method of Example D)

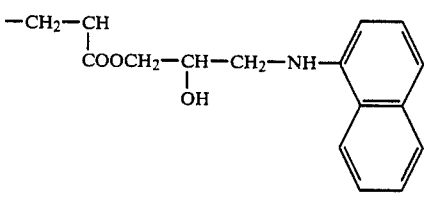

What we claim is:

1. A resinous composition comprising (A) from 5 to 98% by weight of a polyamide and (B) from 95 to 2% by weight of a polyolefin modified with from 0.001 to 10% by mole based on all polymer components of a component having at least one functional group selected from the groups represented by the following general formulas (I), (II) and (III):

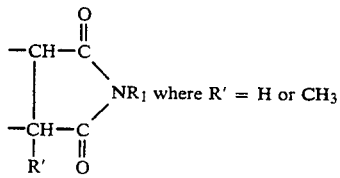 (I)

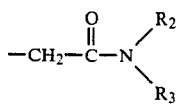 (II)

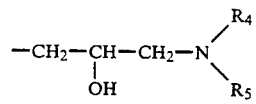 (III)

wherein $R_1$, $R_2$, $R_3$, $R_4$ and $R_5$ in said general formulas (I), (II) and (III) are independently selected from the group consisting of a group represented by the formula:

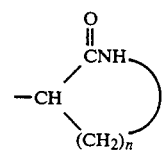

wherein n denotes an integer of 2 to 10, alkyl groups having 1 to 4 carbon atoms, phenyl group and benyl group.

2. The resinous composition according to claim 1 wherein said resinous composition comprises (A) from 10 to 95% by weight of said polyamide and (B) from 90 to 5% by weight of said modified polyolefin.

3. The resinous composition according to claim 1 wherein said resinous composition comprises (A) from 50 to about 95% by weight of said polyamide and (B) from 50 to about 5% by weight of said modified polyolefin.

4. The resinous composition according to claim 1 wherein n in said formula (IV) denotes an integer selected from 2, 3, 4 and 10.

5. The resinous composition according to claim 1 wherein said modified polyolefin has said functional group in the side chain and/or in the main chain of the polyolefin.

6. The resinous composition according to claim 5 wherein said modified polyolefin is selected from the group consisting of polyethylene, ethylene/propylene copolymer, ethylene/butene-1 copolymer, ethylene/propylene/1,4-hexadiene copolymer, ethylene/propylene/5-ethylidenenorbornene copolymer, ethylene/propylene/5-ethyl-2,5-norbornadiene copolymer and ethylene/propylene/dicyclopentadiene copolymer, each having said functional group in its side chain.

7. The resinous composition according to claim 1 wherein said polyamide is selected from the group consisting of polycaproamide, polyhexamethyleneadipamide, polyhexamethylenesebacamide, polyhexamethylenedodecamide, polyundecaneamide, polydodecaneamide, polytrimethylhexamethyleneterephthalamide, polyhexamethyleneisophthalamide, poly-bis(4-aminocyclohexyl) methanedodecamide, poly-m-xylyleneadipamide, polyundecamethyleneterephthalamide, polyundecamethylenehexahydroterephthalamide, and the copolyamides thereof and mixtures.

8. The resinous composition according to claim 1 wherein said polyamide has a relative viscosity of from 2.0 to 5.0.

* * * * *